US012744562B2

(12) United States Patent
Baghel et al.

(10) Patent No.: US 12,744,562 B2
(45) Date of Patent: Sep. 22, 2026

(54) SYSTEMS AND METHODS TO CONFORM TRANSMISSION TO REGULATORY RESTRICTIONS IN WIRELESS COMMUNICATIONS

(71) Applicant: Apple Inc., Cupertino, CA (US)

(72) Inventors: Sudhir K Baghel, Pleasanton, CA (US); Seshu Tummala, Cupertino, CA (US); Amol P Bhatkar, San Jose, CA (US); Mehran T Baghaei, San Diego, CA (US); Venkateswara Rao Manepalli, San Jose, CA (US); Nishant Pattanaik, San Diego, CA (US); Sudeep Bhattarai, Hayward, CA (US); Lohit Sarna, San Mateo, CA (US); Jay P Shah, Newark, CA (US); Sebastian B Seeber, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 17/933,239

(22) Filed: Sep. 19, 2022

(65) Prior Publication Data

US 2024/0097740 A1 Mar. 21, 2024

(51) Int. Cl.
*H04B 7/01* (2006.01)
*H04W 56/00* (2009.01)
*H04W 64/00* (2009.01)

(52) U.S. Cl.
CPC ............ *H04B 7/01* (2013.01); *H04W 56/001* (2013.01); *H04W 64/00* (2013.01)

(58) Field of Classification Search
CPC ....... H04B 7/01; H04W 56/001; H04W 64/00
See application file for complete search history.

(56) References Cited

U.S. PATENT DOCUMENTS 8,699,406 B1 * 4/2014 Charles ................ H04J 3/0652 709/248
10,454,533 B1 * 10/2019 Kogiantis ................ H04B 7/01
2010/0074246 A1 * 3/2010 Harada ............ H04W 56/0045 370/350
2011/0164597 A1 * 7/2011 Amini ................ H04L 27/2657 370/310
2018/0132278 A1 * 5/2018 Oteri ................ H04W 74/0808

(Continued)

OTHER PUBLICATIONS

Doppler Application in LEO Satellite Communication Systems (Year: 2002).*

(Continued)

*Primary Examiner* — Yemane Mesfin
*Assistant Examiner* — Guoxing Fan
(74) *Attorney, Agent, or Firm* — FLETCHER YODER PC

(57) ABSTRACT

Frequency spectrum of wireless transmission signals are allocated based on availability and regulatory requirements. To ensure transmission signals are within designated channel boundary, user equipment utilizes processing circuitry coupled to a transceiver to pre-compensate for estimated frequency shift at the time of transmissions. Certain guard bands are provided such that the actual transmission signals with the frequency pre-compensation are within the designated channel boundary. Additionally, or alternatively, the user equipment utilizes the processing circuitry to pre-compensate for estimated time shift based on a crystal drift using temperature measurement.

20 Claims, 8 Drawing Sheets

(56) References Cited

U.S. PATENT DOCUMENTS

| | | | | |
|---|---|---|---|---|
| 2018/0314289 | A1* | 11/2018 | Chabukswar | G06F 9/485 |
| 2019/0237869 | A1* | 8/2019 | Takahashi | H01Q 3/30 |
| 2019/0313357 | A1* | 10/2019 | Wang | H04W 56/0045 |
| 2021/0328747 | A1* | 10/2021 | Da | H04L 5/0058 |
| 2022/0255653 | A1* | 8/2022 | Ferdowsi | H04J 3/025 |
| 2022/0368412 | A1* | 11/2022 | Xiong | H04B 7/18513 |
| 2022/0376743 | A1* | 11/2022 | Chen | H04L 27/0014 |
| 2023/0047384 | A1* | 2/2023 | Mandawaria | H04W 72/23 |
| 2023/0054715 | A1* | 2/2023 | Li | H04B 7/1855 |
| 2023/0116580 | A1* | 4/2023 | Cheng | H04W 56/0035<br>370/329 |
| 2024/0163815 | A1* | 5/2024 | Mcgiffen | H04W 56/001 |

OTHER PUBLICATIONS

An Efficient Blind Doppler Shift Estimation and Compensation Method for LEO Satellite Communications (Year: 2020).*
TS38.211 (Year: 2022).*
Two stage frequency offset pre-compensation scheme for satellite mobile terminals (Year: 2018).*
Temperature Compensation of Crystal References in NB-IoT Modems (Year: 2020).*

* cited by examiner

SYSTEMS AND METHODS TO CONFORM TRANSMISSION TO REGULATORY RESTRICTIONS IN WIRELESS COMMUNICATIONS

BACKGROUND

The present disclosure relates generally to wireless communication, and more specifically to dynamically adjusting transmission signals to meet regulatory restrictions in wireless communications.

User equipment (e.g., a mobile communication device) may transmit and receive wireless signals (e.g., carrying user data) to and from a communication hub (e.g., a gateway, a base station, or a network control center) via a communication node (e.g., a non-terrestrial station, a satellite, and/or a high-altitude platform station). For instance, the communication node may emit multiple beams (e.g., including an uplink beam and a downlink beam) to cover different geographical areas. The communication hub may transmit a wireless "hub" signal to the communication node, and the communication node may relay the hub signal as a downlink signal to the user equipment via the downlink beam. The user equipment may transmit a user signal as an uplink signal to the communication node via the uplink beam, and the communication node may relay the user signal to the communication hub. Frequency spectrum used in the uplink and downlink signals for wireless communications are allocated based on availability and regulatory restrictions. For example, at any given time transmission frequency spectrum of the user equipment are consistently within a communication channel bandwidth or boundary. However, movements of the communication node may result in frequency shifts. This may create challenges for the user equipment to maintain the transmission frequency spectrum to be within the communication channel boundary.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment includes one or more antennas, a receiver coupled to the one or more antennas, a transmitter coupled to the one or more antennas, and processing circuitry coupled to the receiver and transmitter and configured to synchronize to a communication node of multiple communication nodes; receive a first set of data samples of a first signal using a channel of multiple channels associated with a beam of multiple beams emitted by the communication node based on a bandwidth of the channel at the receiver; adjust a second set of data samples of a second signal based on a frequency shift associated with the channel; and transmit, from the transmitter, the second signal to the communication node using the channel associated with the beam.

In another embodiment, a non-transitory, computer-readable medium includes instructions that, when executed by processing circuitry, cause the processing circuitry to synchronize to a communication node of multiple communication nodes; receive, at a receiver, a first set of data samples of a first signal using a channel of multiple channels associated with a beam of multiple beams emitted by the communication node based on a bandwidth of the channel; adjust a second set of data samples of a second signal based on a time shift associated with the channel; and transmit, at a transmitter, the second signal to the communication node using the channel associated with the beam.

In yet another embodiment, an electronic device includes a transceiver and processing circuitry communicatively coupled to the transceiver and configured to receive a first set of data samples of a first signal using a channel of multiple channels associated with a beam of multiple beams emitted by a communication node based on a bandwidth of the channel at the transceiver; adjust a second set of data samples of a second signal based on a frequency shift and a time shift associated with the channel; and transmit, using the transceiver, the second signal to the communication node using the channel associated with the beam.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
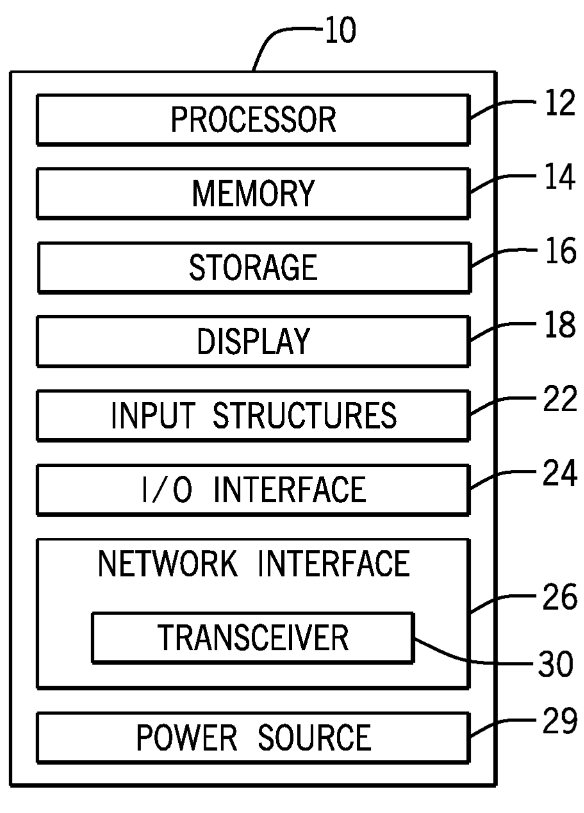
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to a communication system having a user equipment, a communication node, and a communication hub. The user equipment uses the communication node for bi-directional communication by relaying signals from the user equipment to the communication hub via the communication node, and vice versa. The communication node may emit multiple beams to cover different geographical areas. Each beam may transmit downlink signals to the user equipment or receive uplink signals from the user equipment. A time-division multiplexing (TDM) method may be used such that different beams are emitted in different beam time slots at different time periods (communication cycles). Each communication cycle may correspond to a signal frame, which may include multiple fields, such as a preamble and broadcast interval (BI) followed by broadcast (BCAST) and unicast (UCAST) data for each beam spread in a TDM manner. The communication node and the user equipment may transmit signals in a designated frequency band subdivided into channels (e.g., wireless communication channels each having a designated channel bandwidth). The channels may be designated based on certain regulatory allowances and restrictions. For example, the Federal Communications Commission may enforce regulatory restrictions to regulate interstate and international communications through cable, radio, television, satellite, and wire. To comply with the regulatory allowances and restrictions, the user equipment has to maintain transmissions (e.g., frequency spectrum of the transmitted signals) to be within a communication channel boundary designated to the user equipment.

However, certain factors, such as fast movements (e.g., relative to the user equipment) of the communication node may result in time and frequency shifts in the uplink and downlink signals. Such time and frequency shifts may create challenges for the user equipment to maintain the transmission frequency spectrum to be within the communication channel boundary. To prevent the frequency spectrum of transmitted signals from transmitting beyond the communication channel boundary designated to the user equipment, it may be desirable to pre-compensate for an estimated frequency shift (e.g., a doppler shift) at the time of transmissions. In some embodiments, the wireless communication channels are designated based on guard bands that facilitate maintaining the signals within the designated channel bandwidth.

With the foregoing in mind, FIG. 1 is a block diagram of user equipment 10 (e.g., an electronic device or a mobile communication device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, the memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable the user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol.

The network interface 26 may include, for example, one or more interfaces for a peer-to-peer connection, a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a 3$^{rd}$ generation (3G) cellular network, universal mobile telecommunication system (UMTS), 4$^{th}$ generation (4G) cellular network, long term evolution (LTE®) cellular network, long term evolution license assisted access (LTE-LAA) cellular network, 5$^{th}$ generation (5G) cellular network, New Radio (NR) cellular network, 6$^{th}$ generation (6G) cellular network and beyond, a satellite connection (e.g., via a satellite network), and so on. In particular, the network interface 26 may include, for example, one or more interfaces for using a Release-15 cellular communication standard of the 5G specifications that include the millimeter wave (MM Wave) frequency range (e.g., 24.25-300 gigahertz (GHz)). The network interface 26 of the user equipment 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, UWB network, alternating current (AC) power lines, and so forth. The network interface 26 may, for instance, include a transceiver 30 for communicating signals using one of the aforementioned networks. The power source 29 of the user equipment 10 may include any suitable source of power, such as a rechargeable lithium polymer (Li-poly) battery and/or an alternating current (AC) power converter.

Figure 2:
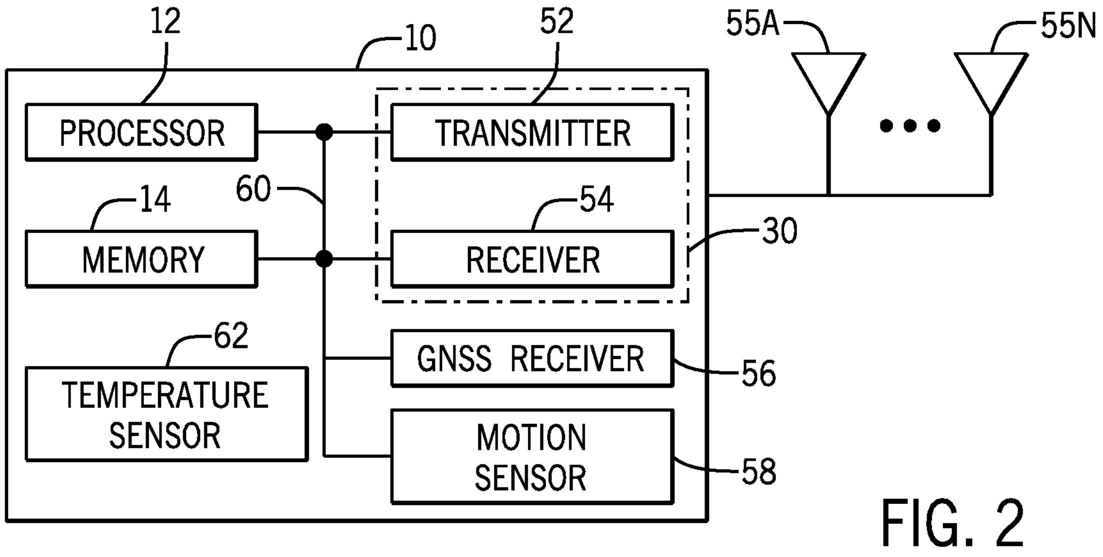
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55), and/or a global navigation satellite system (GNSS) receiver 56 may be communicatively coupled directly or indirectly (e.g., through or via another component, a communication bus, a network) to one another to transmit and/or receive signals between one another.

The user equipment 10 may include the transmitter 52 and/or the receiver 54 that respectively transmit and receive signals between the user equipment 10 and an external device via, for example, a network (e.g., including base stations) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. For example, the user equipment 10 may include a first transceiver to send and receive messages using a first wireless communication network, a second transceiver to send and receive messages using a second wireless communication network, and a third transceiver to send and receive messages using a third wireless communication network, though any or all of these transceivers may be combined in a single transceiver. In some embodiments, the transmitter 52 and the receiver 54 may transmit and receive information via other wired or wireline systems or means.

The user equipment 10 may include the GNSS receiver 56 that may enable the user equipment 10 to receive GNSS signals from a GNSS network that includes one or more GNSS satellites or GNSS ground stations. The GNSS signals may include a GNSS satellite's observation data, broadcast orbit information of tracked GNSS satellites, and supporting data, such as meteorological parameters, collected from co-located instruments of a GNSS satellite. For example, the GNSS signals may be received from a Global Positioning System (GPS) network, a Global Navigation Satellite System (GLONASS) network, a BeiDou Navigation Satellite System (BDS), a Galileo navigation satellite network, a Quasi-Zenith Satellite System (QZSS or Michibiki) and so on. The GNSS receiver 56 may process the GNSS signals to determine a global position of the user equipment 10.

The user equipment 10 may include one or more motion sensors 58 (e.g., as part of the input structures 22). The one or more motion sensors (collectively referred to as "a motion sensor 58" herein) may include an accelerometer, gyroscope, gyrometer, and the like, that detect and/or facilitate determining a current location of the user equipment, an orientation (e.g., including pitch, yaw, roll, and so on) and/or motion of the user equipment 10, a relative positioning (e.g., an elevation angle) between the user equipment 10 and a communication node.

As illustrated, the various components of the user equipment 10 may be coupled together by a bus system 60. The bus system 60 may include a data bus, for example, as well as a power bus, a control signal bus, and a status signal bus, in addition to the data bus. The components of the user equipment 10 may be coupled together or accept or provide inputs to each other using some other mechanism.

The user equipment 10 may include a temperature sensor 62 to measure temperature of certain components (e.g., an oscillator) of the user equipment 10. In some cases, changes in temperature may alter a crystal regulating the oscillator, causing oscillator drifts or crystal drifts. Such crystal drifts may lead to undesired progressive changes in time. The user equipment 10 may keep track of the crystal drifts based on estimating the crystal drifts using temperature reading of the temperature sensor 62.

As discussed above, the user equipment 10 may transmit a signal, via the transmitter 52, directed to a communication node for subsequent transmission to a communication hub. For example, the user equipment 10 may transmit different signals at a transmission power to enable successful receipt of the signals by the communication node. However, in response to determining that the communication node does not successfully receive the signal (e.g., due to a non-functional reverse beam), the user equipment 10 may switch to a second communication node and re-transmit the signal to the second communication node, such as until the user equipment 10 determines that the second communication node successfully receives the signal (e.g., in response to receipt of an acknowledgement signal from the second communication node).

Figure 3:
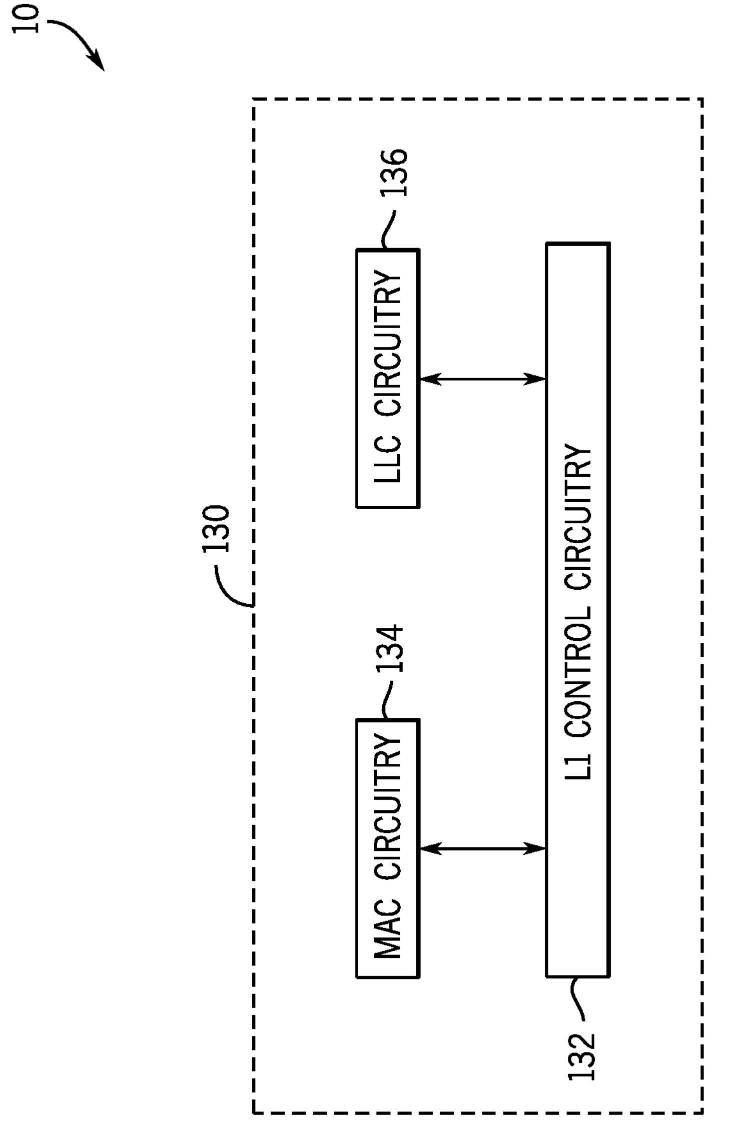
FIG. 3 is a schematic diagram of circuitry of the user equipment of FIG. 1, according to embodiments of the present disclosure.

FIG. 3 is a schematic diagram of circuitry 130 of the user equipment 10. As an example, the circuitry 130 may include data processing circuitry of the processor 12. The circuitry 130 may include Layer 1 (L1) control circuitry 132 (e.g., an L1 controller), media access control (MAC) circuitry 134, and logic link control (LLC) circuitry 136. Each of the MAC circuitry 134 and the LLC circuitry 136 may be communicatively coupled to the L1 control circuitry 132.

In some embodiments, the L1 control circuitry 132 may operate based on information received from the MAC circuitry 134 and/or the LLC circuitry 136. For example, the MAC circuitry 134 and/or the LLC circuitry 136 may receive (e.g., download) communication node information from a communication network (e.g., the Internet). The communication node information may include communication node identifiers (e.g., communication node identification information) associated with multiple communication nodes that may be used by the user equipment 10 for communications, beam identifiers (e.g., beam identification information) associated with beams emitted by each communication node, communication channel information (e.g., regulatory restrictions regarding the manner of subdividing a designated frequency band into multiple communication channels, a total number of communication channels in the designated frequency band, communication channel identifiers, a designated channel bandwidth associated with each communication channel, a boundary (e.g., lower and upper frequency limits) associated with each communication channel), radio parameters (e.g., root sequence, spreading code, or scrambling code) of the fields (e.g., preamble, broadcast interval, broadcast (BCAST) and unicast (UCAST) data) associated with each beam, beam status information (e.g., functional or non-functional), and/or any other relevant information (e.g., timing, orbit, elevation).

In certain embodiments, the communication node information may be updated based on a predetermined frequency or cycle. For instance, the user equipment 10 may communicatively couple to the communication network periodically (e.g., on a daily basis, a weekly basis, after any suitable number of days or weeks, and so on), to download and/or receive updated communication node information. The MAC circuitry 134 and/or the LLC circuitry 136 may also receive other relevant information, such as a global position of the user equipment 10 from the GNSS receiver 56, orientation information (e.g., pitch, yaw, roll, and so on) and/or motion of the user equipment 10 from the motion sensor 58, relative positioning information (e.g., a distance, an elevation angle) between the user equipment 10 and the communication node, and so on. The user equipment 10 may store the communication node information in the memory 14 or the storage 16 (e.g., in the form of a database).

Prior to initiating wireless communications, the user equipment 10 may use the L1 control circuitry 132, the MAC circuitry 134, and the LLC circuitry 136 to perform certain operations to determine appropriate communication systems, devices, and components that may establish or secure desired communication quality for the wireless communications. For instance, the user equipment 10 may receive a request for initiating the wireless communications from a device (e.g., the L1 controller) corresponding to an upper layer (e.g., logic link control (LLC) layer). In response to the request, the user equipment 10 may perform a communication node search based on node data extracted from communication node information stored in a database of the user equipment 10. For instance, the user equipment 10 may use the communication node identifiers to extract (e.g., using the MAC circuitry 134 and/or the LLC circuitry 136) the node data, such as timing, orbit, and elevation data of the communication nodes corresponding to the communication node identifiers, global position of the user equipment 10, orientation data and/or motion of the user equipment 10, relative positioning data between the user equipment 10 and each communication node, and the like. Based on analysis on the extracted node data, the user equipment 10 may determine a suitable communication node for the wireless communications.

In a process of determining a desired beam associated with the determined communication node for data communication, the user equipment 10 may perform a beam search at the beginning of a synchronization process in which the user equipment 10 synchronizes to the communication node. For example, the user equipment 10 may receive a synchronization request from a device (e.g., the L1 controller) corresponding to an upper layer (e.g., logic link control (LLC) layer). The synchronization request may include a communication node identifier associated with the communication node. Based on the communication node identifier, the user equipment 10 may extract (e.g., using the MAC circuitry 134 and/or the LLC circuitry 136) beam data from the communication node information stored in the database of the user equipment 10, such as the radio parameters associated with each beam emitted by the communication node for the beam search and the other relevant information from stored data (e.g., in the database) of the user equipment 10. Based on analysis on the extracted information, the user equipment 10 may determine a desired beam for the wireless communications.

After determining the desired beam associated with the suitable communication node, the user equipment 10 may further perform a channel search to determine a suitable communication channel associated with the desired beam for data communication. For example, using the communication channel identifiers associated with communication channels, the user equipment 10 may extract (e.g., using the MAC circuitry 134 and/or the LLC circuitry 136) communication channel data from the communication node information stored in the database of the user equipment 10, such as regulatory restrictions, designated channel bandwidths and boundaries, and so on. Based on analysis on the extracted information, the user equipment 10 may determine the suitable communication channel.

In some embodiments, the L1 control circuitry 132 may cause the transceiver 30 to receive or transmit a signal via the suitable communication channel from the desired beam associated with the suitable communication node determined based on the data received from the MAC circuitry 134 and/or the LLC circuitry 136. For example, the MAC circuitry 134 may communicate with the L1 control circuitry 132 to indicate that the signal is to be received/transmitted by the user equipment 10 (e.g., as a downlink/uplink signal) from/to the suitable communication node at a designated time corresponding to the suitable communication channel associated with the desired beam. Moreover, the MAC circuitry 134 may provide information indicating signal frame structure and cycle, such as a time duration of each data sample, sequence of fields in each data sample, a time duration of each field, and so on. Furthermore, the LLC circuitry 136 may provide additional information (e.g., a current location of the user equipment 10, orientation information of the user equipment 10, relative positioning between the user equipment 10 and the suitable communication node). In some embodiments, the MAC circuitry 134 and/or the LLC circuitry 136 may provide such information with updates to the L1 control circuitry 132 at a predetermined frequency or communication cycle. Thus, the L1 control circuitry 132 may continually receive updated information from the MAC circuitry 134 and/or the LLC circuitry 136 and may readily utilize the updated information when the L1 control circuitry 132 is to cause the transceiver 30 to receive/transmit the signal (e.g., in a radio frequency signal) from/to the suitable communication node.

Figure 4:
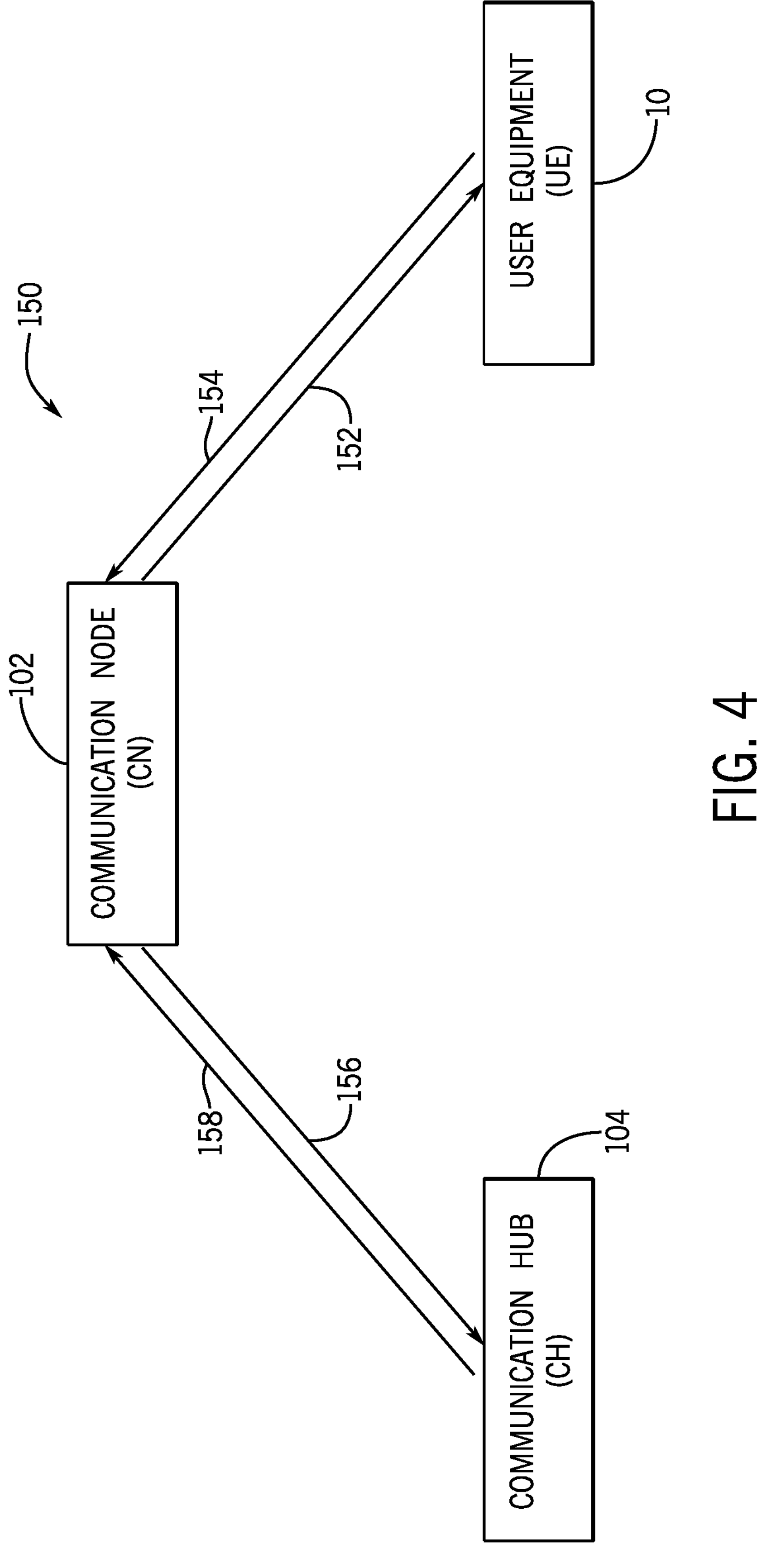
FIG. 4 is a schematic diagram of a communication system having a communication hub, a communication node, and the user equipment of FIG. 1, according to embodiments of the present disclosure.

With the preceding in mind, FIG. 4 is a schematic diagram of a communication system 150 using a communication node for signal transmissions with the user equipment of FIG. 1, according to embodiments of the present disclosure. The communication system 150 includes the user equipment 10, a communication node 102, and a communication hub 104. The communication node 102 may include base stations, such as Next Generation NodeB (gNodeB or gNB) base stations that provide 5G/NR coverage to the user equipment 10, Evolved NodeB (eNodeB) base stations and may provide 4G/LTE coverage to the user equipment 10, and so on. Additionally or alternatively, the communication node 102 may include non-terrestrial base stations, high altitude platform stations, airborne base stations, space borne base stations, a satellite, or any other suitable nonstationary communication devices, communicatively coupled to the user equipment 10.

The communication node 102 may be communicatively coupled to the communication hub 104, which may include another electronic device, such as a terrestrial base station, a ground station, a call center, and so forth, to enable communication of signals between the communication hub 104 and the user equipment 10 via the communication node 102. For example, the user equipment 10, using its transceiver 30, may transmit a signal to the communication node 102, and the communication node 102 may forward the signal to the communication hub 104. Additionally or alternatively, the communication hub 104 may transmit a signal to the communication node 102, and the communication node 102 may forward the signal to the user equipment 10 for receipt, using its transceiver 30. In some embodiments, the transceiver 30 may include a software-defined radio that enables communication with the communication node 102. For example, the transceiver 30 may be capable of communicating via a first communication network (e.g., a cellular network), and may be capable of communicating via a second communication network (e.g., a non-terrestrial network) when operated by software (e.g., stored in the memory 14 and/or the storage 16 and executed by the processor 12).

At each communication cycle (e.g., time period designated for communication between the user equipment 10 and the communication node 102), the user equipment 10 may synchronize to the communication node 102 to establish a connection for bi-directional communication. The communication node 102 may emit multiple beams to cover different geographical areas. Each beam may be used to transmit downlink signals to the user equipment 10 or receive uplink signals from the user equipment 10. For example, the user equipment 10 may transmit an uplink signal to the communication node 102 via a beam 152 (e.g., a reverse beam that receives the uplink signal), and receive a downlink signal from the communication node 102 via a beam 154 (e.g., a forward beam that transmits the downlink signal to the user equipment 10). The communication node 102 may also synchronize to the communication hub 104 to establish a connection for bi-direction communication. For example, the communication node 102 may relay the uplink signal to the communication hub 104 via a beam 156 (e.g., a communication-node-to-communication-hub beam), and receive a communication hub signal (e.g., a signal in response to the uplink signal sent from the user equipment 10) from the communication hub 104 via a beam 158 (e.g., a communication-hub-to-communication-node beam).

Coverage of beam may change over a period of time (e.g., due to movement of the communication node 102). For example, at a given communication cycle, the user equipment 10 may receive downlink signals with desired signal quality (e.g., signal strength, signal-to-noise ratio) using a first beam when the communication node 102 is at a first position. However, at the next communication cycle, the first beam may not provide downlink signals with desired signal quality when the communication node 102 is at a second position, and the user equipment 10 may switch to a second beam to maintain a reliable connection with the communication node 102. In some embodiments, the user equipment 10 may track a desired beam (e.g., a default beam) at each communication cycle while synchronized to the communication node 102.

Figure 5:
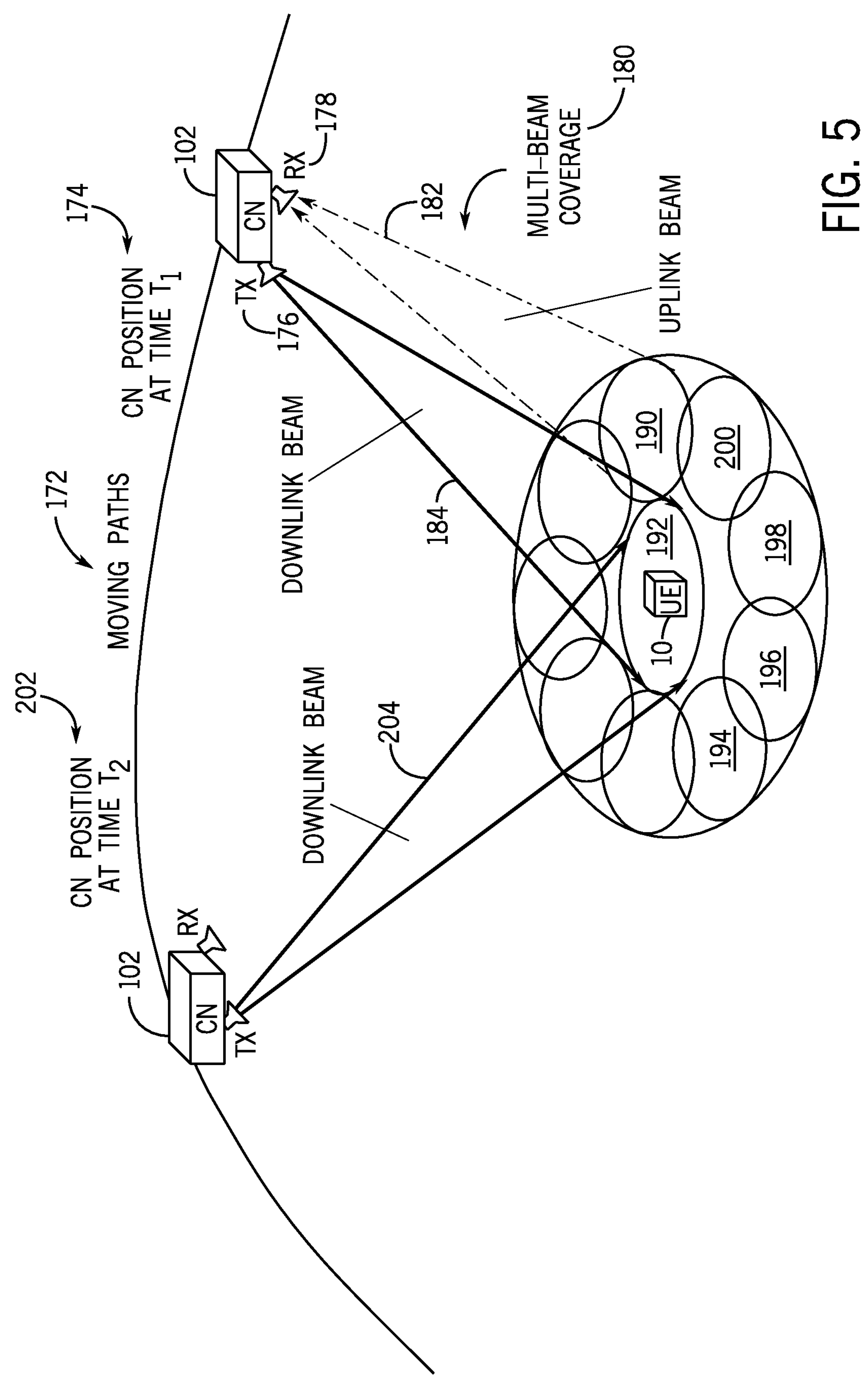
FIG. 5 is a schematic diagram of the communication system of FIG. 4 using multi-beam coverage for signal communication with the user equipment of FIG. 1, according to embodiments of the present disclosure.

FIG. 5 is a schematic diagram of the communication system 150 of FIG. 4 using multi-beam coverage for signal transmissions with the user equipment 10 of FIG. 1, according to embodiments of the present disclosure. As illustrated, the communication node 102 may move along one or more moving paths 172 (e.g., orbits of the Earth). For example, at time $T_1$, the communication node is at a position 174. The communication node 102 may include a transmitter (TX) 176 and a receiver (RX) 178, which may be similar in structure and function to the transmitter 52 and the receiver 54 of the user equipment 10, respectively. At the position 174, the communication node 102 may utilize the transmitter 176 and receiver 178 to emit multiple beams (e.g., downlink beams that transmit downlink signals, uplink beams that receive uplink signals) covering same or different areas. The multiple beams may be emitted in different beam time slots distributed or spread in a time-division multiplexing (TDM) manner. For example, the communication node 102 may have multi-beam coverage 180 within which the communication node 102 may receive an uplink signal using an uplink beam (e.g., an uplink beam 182) in one beam time slot from the user equipment 10 or transmit a downlink signal using a downlink beam (e.g., a downlink beam 184) in another beam time slot to the user equipment 10. Each beam may cover a geographical area (e.g., area 190, 192, 194, 196, 198, 200, and so on) on the surface of the Earth. For example, the uplink beam 182 covers the area 190 and the downlink beam 184 covers the area 192. Some areas may overlap with one or more neighboring areas. For example, the areas 192 may overlap with other areas, such as areas 190, 194, and 200. While only two beams 182, 184 are illustrated as being emitted from the communication node 102 at time $T_1$, it should be understood that any suitable number of beams may be emitted (e.g., 2 or more, 3 or more, 4 or more, 6 or more, 8 or more, 12 or more, and so on). At time $T_2$, the communication node 102 moves to a position 202. The communication node 102 may continue utilizing the transmitter 176 and receiver 178 to emit multiple beams. For example, the transmitter 176 may emit a downlink beam 204 that covers the area 192. While only one beam 204 is illustrated as being emitted from the communication node 102 at time $T_2$ for exemplary purposes, it should be understood that any suitable number of beams may be emitted.

At the time $T_1$, the user equipment 10 may be at a location within the multi-beam coverage 180. In some cases, one or more areas corresponding to different beams may cover the location of the user equipment 10. In the illustrated example, the areas 190, 192, and 200 cover the location of the user equipment 10. The user equipment 10 may determine a first desired beam (e.g., the downlink beam 184 covering the area 192) that is more suitable than other beams (e.g., beams covering the areas 190 and 200) based on detected downlink signals (e.g., detected preambles of the downlink signals). As the communication node 102 moves toward the position 202, the user equipment 10 may receive I/Q samples (or in-phase and/or quadrature samples) at a designated time corresponding to the downlink beam 184. The user equipment 10 may decode a broadcast interval in each I/Q sample to retrieve certain information (e.g., yaw information) associated with the communication node 102. Based on the decoded broadcast interval and other relevant information (e.g., a GNSS time and a location of the user equipment 10, the radio parameters, and a predicated movement of the communication node 102), the user equipment 10 may determine a second desired beam (e.g., the downlink beam 204) that is suitable for data communications at time $T_2$.

Figures 6, 7:
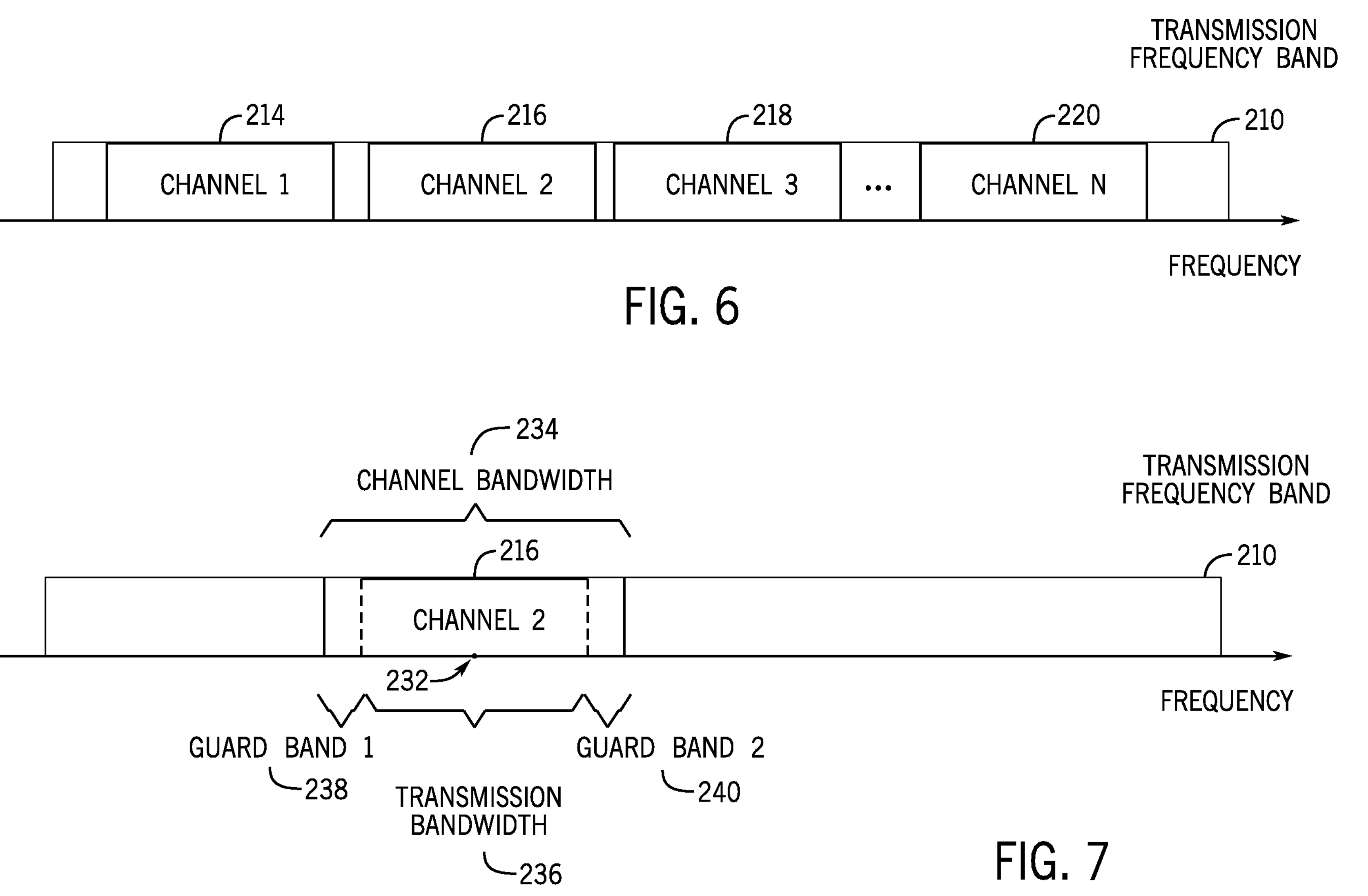
FIG. 6 is a frequency diagram of a transmission frequency band including multiple communication channels used by the communication system of FIG. 4, according to embodiments of the present disclosure.
FIG. 7 is a frequency diagram of the transmission frequency band and a bandwidth of a selected communication channel from the multiple channels of FIG. 6, according to embodiments of the present disclosure.

As mentioned in previous sections, the user equipment 10 or the communication node 102 may transmit signals in a designated frequency band subdivided into multiple communication channels. The communication channels may be divided and designated based on the regulatory restrictions. FIG. 6 is a frequency diagram of a transmission frequency band 210 including multiple communication channels used by the communication system 150 of FIG. 4, according to embodiments of the present disclosure. For instance, the transmission frequency band 210 may include N (where N may be 1, 2, 3, 5, 10, 100, or any other suitable number) communication channels, such as channels 214 (channel 1), 216 (channel 2), 218 (channel 3), and 220 (channel N). Each channel may have a designated channel bandwidth. While the illustrated channels do not overlap with each other, it should be understood that certain channels may overlap (e.g., partially) with neighboring channel(s) in some embodiments.

FIG. 7 is a frequency diagram of the transmission frequency band 210 and a bandwidth of a communication channel selected from the multiple channels (e.g., channels 1, 2, 3, . . . , N) of FIG. 6, according to embodiments of the present disclosure. For instance, the user equipment 10 may determine and/or select the channel 216 (channel 2) as a suitable communication channel for data communications. The channel 216 may be designated with a center frequency 232 and a channel bandwidth 234. The user equipment 10 may transmit signals (e.g., uplink signals) with a transmission bandwidth 236 within the channel bandwidth 234. Additionally, guard bands, such as guard bands 238 and 240 (frequency buffers on each side of the transmission band, may facilitate maintaining transmission signals (e.g., pre-compensated signals) within the channel bandwidth 234.

Figure 8:
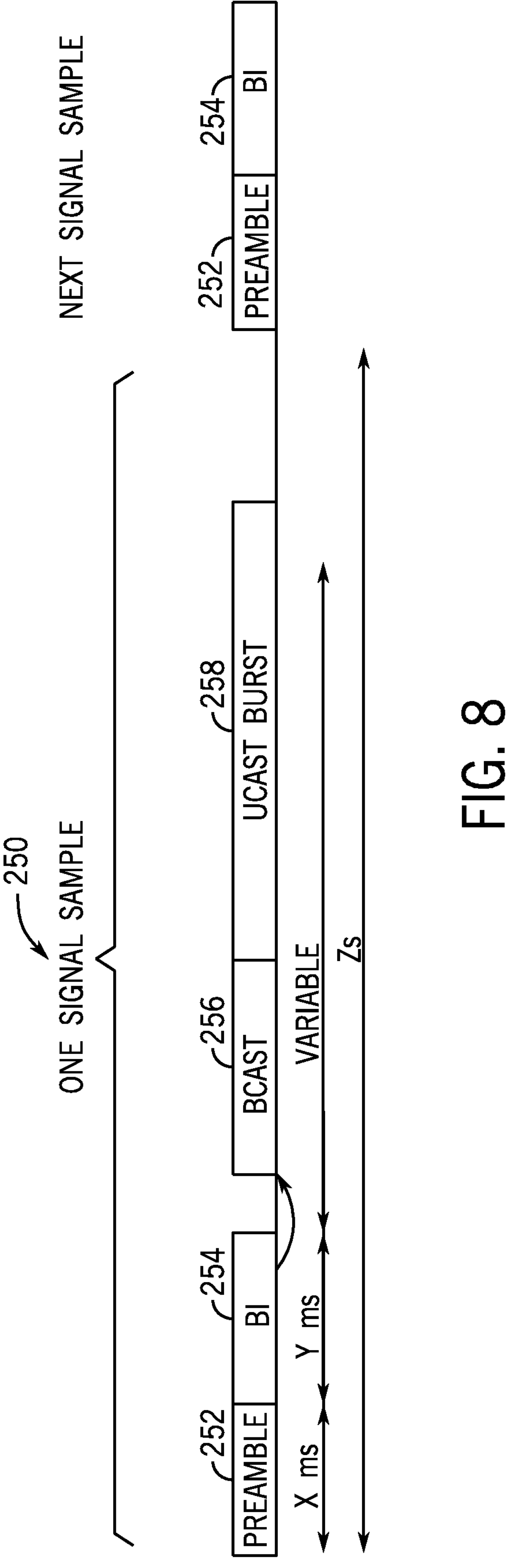
FIG. 8 is a schematic diagram of signal frame structure and cycle for signals transmitted by a communication node and received by the user equipment of FIG. 4, according to embodiments of the present disclosure.

FIG. 8 is a schematic diagram of signal frame structure and cycle for signals transmitted by the communication node 102 and received by the user equipment 10 of FIG. 4. As mentioned above, the user equipment 10 may receive a downlink signal from a communication node (e.g., communication node 102) via a downlink beam (e.g., downlink beam 184 or 204). The downlink signal may be configured based on certain communication parameters (e.g., radio parameters including root sequence, spreading code, and scrambling code) associated with the downlink beam. The communication parameters may be received (e.g., downloaded) by the MAC circuitry 134 and/or the LLC circuitry 136 from a communication network (e.g., the Internet) and saved in a database in the memory 14 or the storage 16. The communication network may update the communication parameters based on a predetermined frequency or cycle. For instance, the user equipment 10 may communicatively couple to the communication network periodically (e.g., on a daily basis, a weekly basis, after any suitable number of days or weeks, and so on) to download updated communication parameters.

The downlink signal may include multiple signal samples, such as the signal sample 250, each having a preamble 252, a broadcast interval (BI) 254, a broadcast (BCAST) section 256, and a unicast (UCAST) section 258. The preamble 252 may facilitate synchronizing transmission timing between the user equipment 10 and the communication node 102. The preamble 252 may be located at a beginning section of the downlink signal and have a time duration (e.g., X milliseconds (ms), which may include 5 seconds or less, 2 seconds or less 1 second or less, 500 ms or less, 100 ms or less, 50 ms or less, 10 ms or less, and so on). The broadcast interval 254 may follow the preamble 252 in the downlink signal and have a time duration (e.g., Y ms, which may include 5 seconds or less, 2 seconds or less, 1 second or less, 500 ms or less, 100 ms or less, 50 ms or less, 10 ms or less, and so on). The broadcast interval 254 may include communication node information (e.g., position, orientation, and so on) that may be decoded by the user equipment 10. For example, the decoded broadcast interval 254 may include orientation information (e.g., yaw information) associated with the communication node 102. The broadcast (BCAST) section 256 and the unicast (UCAST) section 258 may include or be associated with payload or user data (e.g., data used in various forms of communication, such as emergency text messaging, emergency voice calling, acknowledgement messaging, video streaming, internet browsing, and so forth). The broadcast (BCAST) section 256 and the unicast (UCAST) section 258 may have a variable time duration (e.g., depending on the data content, which may include 5 seconds or less, 2 seconds or less, 1 second or less, 500 ms or less, 100 ms or less, 50 ms or less, 10 ms or less, and so on). Each subsequent signal sample may have a time interval (e.g., Z second (s), which may include 10 seconds or less, 5 seconds or less, 2 seconds or less, 1 seconds or less, and so on) with respect to a preceding signal sample (e.g., the time interval may be measured based on a time difference between the preamble 252 of the first and the second signal samples).

Figure 9:
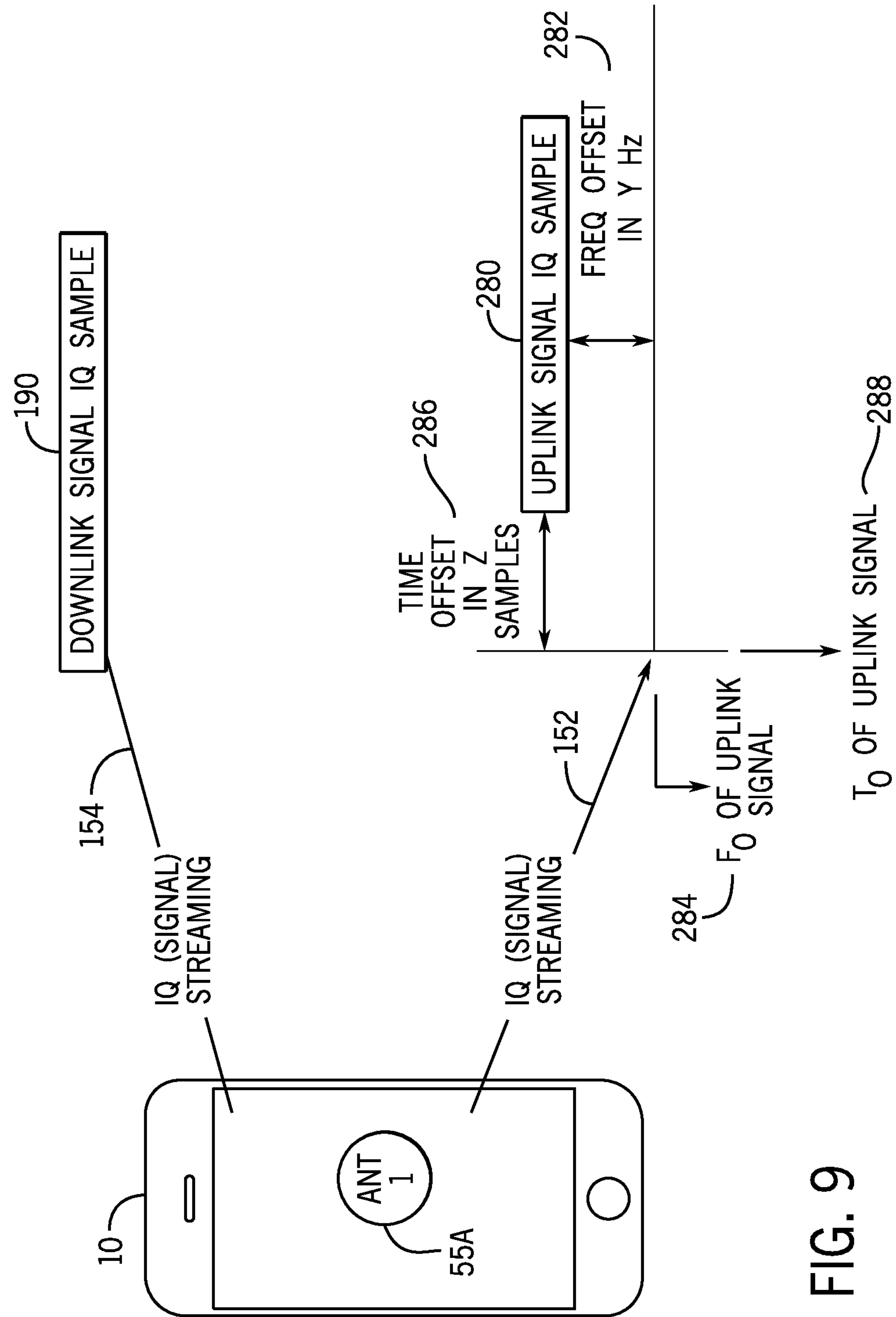
FIG. 9 is a set of timing diagrams of the user equipment of FIG. 1 using an antenna to receive a downlink signal and transmit an uplink signal, according to embodiments of the present disclosure.

The user equipment 10 may receive downlink signals from the communication node 102 or transmit uplink signals to the communication node 102. The downlink and uplink signals may have the frame structure and cycle described in FIG. 8. FIG. 9 is a set of timing diagrams of the user equipment 10 (e.g., a mobile phone) of FIG. 1 using the antenna 55A to receive a downlink signal and transmit an uplink signal, according to embodiments of the present disclosure. Each received or transmitted signal may include streamed data, such as I/Q samples (or in-phase and/or quadrature samples) received at the antenna 55A (Ant 1), or one or more antennas 55. In radio frequency (RF) applications, a pair of periodic signals may be referred to be in "quadrature" when they differ in phase (e.g., by 90 degrees). The "in-phase" or reference signal is referred to as 'I,' and the signal that is shifted by 90 degrees (the signal in quadrature) is referred to as 'Q.'

As described previously, certain factors (e.g., movements of the communication node 102 relative to the user equipment 10, temperature changes, and so on) may cause time and frequency shifts in the signals (e.g., uplink and downlink signals) communicated between the user equipment 10 and the communication node 102. For example, the user equipment 10 may receive a downlink signal from the communication node 102 via a first communication channel of the downlink beam 154. The downlink signal may include an I/Q sample 190. Similarly, the user equipment 10 may schedule transmission of an uplink signal to the communication node 102 via a second communication channel of the beam 152. The uplink signal may include an I/Q sample 280. Processing circuitry 12 (e.g., circuitry 130) of the user equipment 10 may determine (e.g., based on prediction or estimation) a frequency offset 282 (e.g., in Y Hertz (hz)) with respect to a central frequency ($F_0$) 284 in a frequency domain (e.g., using Fourier transform or fast Fourier transform (FFT)). Additionally, the circuitry 130 may determine a time offset 286 (e.g., in Z samples) with respect to a starting time ($T_0$) 288 in a time domain.

In some embodiments, the circuitry 130 may use a relative positioning between the communication node 102 and the user equipment 10 to determine the frequency offsets 282 and/or the time offsets 286. In one example, the relative positioning may include data from ephemeris data, such as various operating parameters that may be associated with movement (e.g., orbital location, orientation) of the communication node 102, movement of the Earth (e.g., a gravitational property, an orbit of the Earth), a historical positioning of the communication node 102, and the like. In another example, the relative positioning may include data from GNSS signals (e.g., received by the GNSS receiver 56), such as observation data, broadcast orbit information, and supporting data associated with GNSS satellites that may be used to determine a current location of the user equipment 10. In another example, the relative positioning may include data from orientation data received from the motion sensor 58 to determine an orientation of the user equipment 10.

Additionally or alternatively, the circuitry 130 may receive temperature reading from the temperature sensor 62 measuring temperature of certain components (e.g., an oscillator) of the user equipment 10. Changes in temperature may alter a crystal regulating the oscillator, causing oscillator drifts or crystal drifts. Such crystal drifts may lead to undesired progressive changes in time such as time shifts. As such, the circuitry 130 may determine the time shifts based on or using temperature reading of the temperature sensor 62.

The time and frequency shifts described above may create difficulties for the user equipment 10 to maintain transmission frequency spectrum to be within a designated channel bandwidth (e.g., the channel bandwidth 234). To prevent the frequency spectrum of transmitted signals from transmitting beyond the designated communication channel boundary designated to the user equipment 10, a pre-compensation based on the determined frequency shift (e.g., frequency offset 282) and/or time shift (e.g., time offset 286) may be applied to the signals before signal transmissions such that the actual bandwidth of transmitted signals (e.g., uplink signals) are consistently within the designated channel bandwidth.

Figure 10:
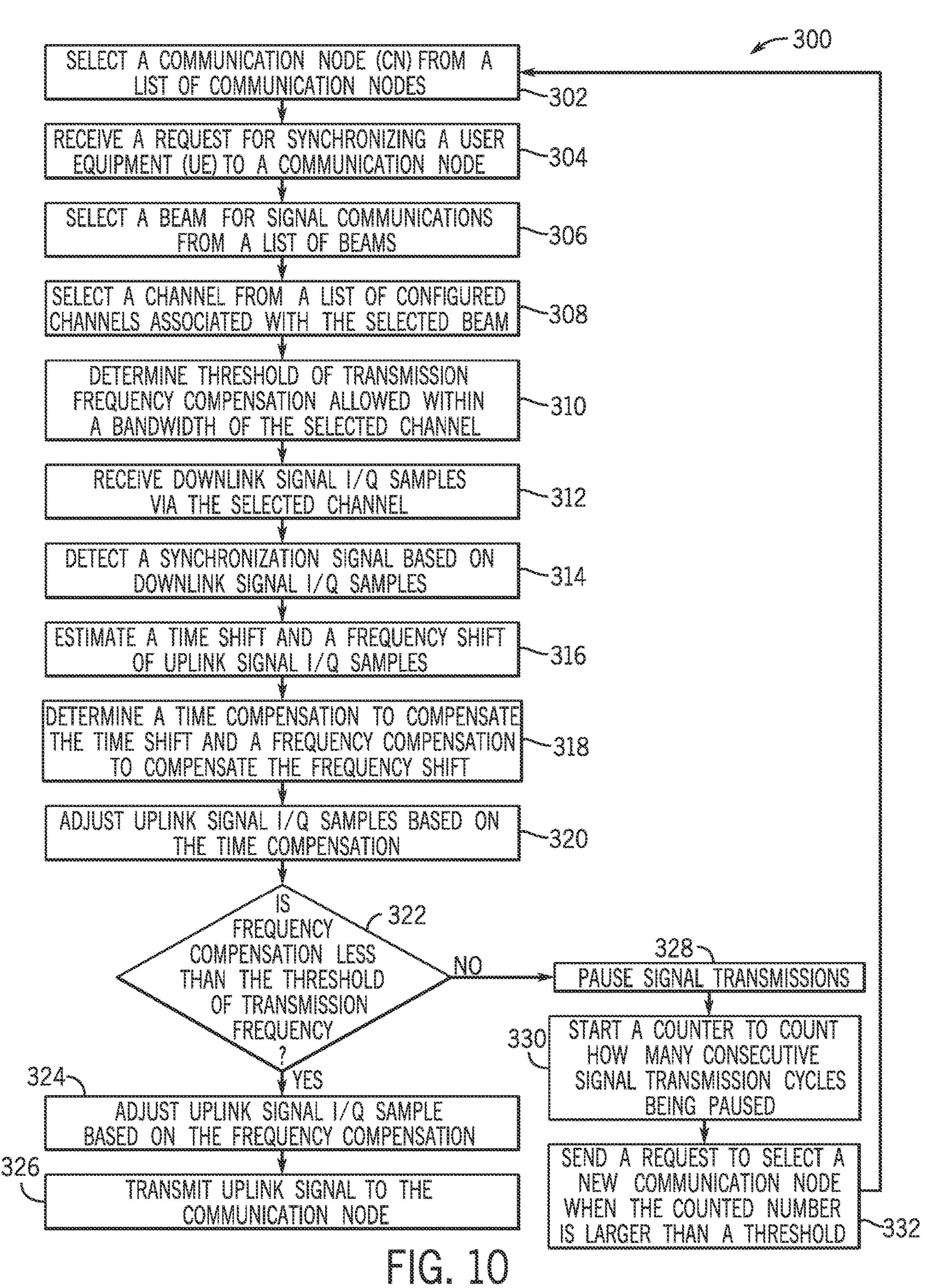
FIG. 10 is a flowchart of a method for dynamically adjusting transmission signals of the user equipment of FIG. 1 to meet regulatory restrictions in wireless communications, according to embodiments of the present disclosure.

With the preceding in mind, FIG. 10 is a flowchart of a method 300 for dynamically adjusting transmission signals of the user equipment 10 of FIG. 1 to meet regulatory restrictions in wireless communications, according to embodiments of the present disclosure. Any suitable device (e.g., a controller) that may control components of the user equipment 10, such as the processor 12, may perform the method 300. In some embodiments, the method 300 may be implemented by executing instructions stored in a tangible, non-transitory, computer-readable medium, such as the memory 14 or storage 16, using the circuitry 130 of the processor 12. For example, the method 300 may be performed at least in part by one or more software components, such as an operating system of the user equipment 10, one or more software applications of the user equipment 10, and the like. While the method 300 is described using steps in a specific sequence, it should be understood that the present disclosure contemplates that the described steps may be performed in different sequences than the sequence illustrated, and certain described steps may be skipped or not performed altogether.

At block 302, the user equipment 10 selects a communication node (e.g., communication node 102) from a list of communication nodes. For example, user equipment 10 may receive or generate a request for initiating wireless communications with the communication node. A device (e.g., the L1 controller) corresponding to an upper layer (e.g., logic link control (LLC) layer) may generate the request that may include the list of communication nodes. The user equipment 10 may query a database (e.g., a database in the memory 14 or the storage 16) based on a list of communication node identifiers corresponding to the list of the communications nodes. Through the querying, the user equipment 10 may extract (e.g., using the MAC circuitry 134 and/or the LLC circuitry 136) related information, such as timing, orbit, and elevation information (e.g., elevation angle) of the listed communication nodes. The user equipment 10 may also receive additional information, such as global position of the user equipment 10, orientation information and/or motion of the user equipment 10, relative positioning information between the user equipment 10 and each communication node, and the like. Based on analysis on the extracted information and additional information, the user equipment 10 may select the communication node 102 for wireless communications.

At block 304, the user equipment 10 receives a synchronization request for synchronizing the user equipment to the communication node 102 selected at block 302. For example, the user equipment 10 may receive the synchronization request from a device (e.g., the L1 controller) corresponding to an upper layer (e.g., logic link control (LLC) layer). The request may include a communication node identifier associated with the communication node 102. The user equipment 10 may use the transceiver 30 and antenna 55 to synchronize to the communication node 102

After synchronizing to the communication node 102, at block 306, the user equipment 10 selects a beam for signal communications from a list of beams. For example, the user equipment 10 may select the beam 152 to transmit uplink signals to the communication node 102. The user equipment 10 may use the communication node identifier associated with the communication node 102 to query the database and extract the radio parameters associated with each beam emitted by the communication node 102. The user equipment 10 may also receive other relevant information (e.g., a GNSS time and a location of the user equipment 10, a predicated movement of the communication node 102) from stored data (e.g., in the database) of the user equipment 10. Based on analysis on the extracted radio parameters and the other relevant information, the user equipment 10 may select the beam 152 for signal communications (e.g., transmitting uplink signals to the communication node 102).

With a communication node and beam selected, at block 308, the user equipment 10 selects a channel from a list of configured channels associated with the selected beam at block 306. For example, the user equipment 10 may select the channel (e.g., channel 216 (channel 2)) based on certain transmission protocol from the list configured channels (e.g., channels 1, 2, 3, . . . , N) allowed in the given geographical region using the geographical location (e.g., location of the user equipment 10). In some embodiments, the transmission protocol may include Wireless Communications Transfer Protocol (WCTP) used to send messages to wireless devices on NPCS (Narrowband PCS) networks. Additionally or alternatively, the user equipment 10 may select the channel based on a signal characteristic of the channel (e.g., a signal power, a signal quality, and so on), a capability to use the channel (e.g., a capability of filtering circuitry of the user equipment 10 to filter the channel frequency), or the like.

At block 310, the user equipment 10 determines a threshold of transmission frequency compensation allowed within a bandwidth (e.g., channel bandwidth 234) of the selected channel (e.g. channel 2). The user equipment 10 may determine the threshold based on the channel bandwidth 234, the center frequency 232, the guard bands 238 and 240, and other related information (e.g., frequency regulation specified in regulatory restrictions). The threshold may be used to determine a limitation (e.g., a maximum transmission frequency compensation allowed) of a pre-compensation applied to signals before signal transmissions, which may prevent frequency spectrum of actually transmitted signals from transmitting beyond the channel bandwidth 234.

At block 312, the user equipment 10 receives a downlink signal containing I/Q samples (e.g., downlink signal I/Q sample 190). For instance, the user equipment 10 may use the antenna 55A to receive the downlink signal I/Q sample 190. The user equipment 10 may decode the downlink signal I/Q sample 190 to retrieve certain fields, such as preamble, broadcast interval, broadcast (BCAST) and unicast (UCAST) data).

At block 314, the user equipment 10 detects a synchronization signal based on the downlink signal I/Q sample. For example, the user equipment 10 may detect the synchronization signal based on the preamble of the downlink signal I/Q sample 190. The synchronization signal may be used to calculate a crystal drift caused by temperature changes.

At block 316, the user equipment 10 estimates a frequency shift and/or a time shift associated with uplink signal I/Q samples (e.g., uplink signal I/Q samples) to be transmitted (e.g., via the antenna 55A) to the communication node 102. For each signal transmission in a communication cycle, the user equipment 10 may estimate the frequency shift (e.g., frequency offset 282) to be pre-compensated in a frequency domain based on the selected communication node 102 (e.g., movements, location, orientation), time (e.g., GPS time), location of the user equipment 10, and other relevant information (e.g., ephemeral information). Additionally, the user equipment may estimate the time shift (e.g., time offset 286) to be pre-compensated in a time domain based on a crystal drift estimated based on temperature reading (e.g. from the temperature sensor 62) and the synchronization signal detected at block 314. In some embodiments, the user equipment 10 may estimate only the frequency shift and not the time shift, or only the time shift and not the frequency shift.

At block 318, the user equipment 10 determines a time compensation to compensate the time shift and/or a frequency compensation to compensate the frequency shift. The magnitude of the time compensation and the frequency compensation may be related (e.g., equal, or proportional) to the magnitude of the time shift and frequency shift. In embodiments where the user equipment 10 estimates only the frequency shift and not the time shift, the user equipment 10 may determine only the frequency compensation to compensate the frequency shift, and not the time compensation. In embodiments where the user equipment 10 estimates only the time shift and not the frequency shift, the user equipment 10 may determine only the time compensation to compensate the time shift, and not the frequency compensation.

At block 320, the user equipment 10 adjust the uplink signal I/Q samples based on the time compensation. Such time adjustments may pre-compensate the uplink signal I/Q samples such that the actually transmitted uplink signal I/Q samples may be adjusted to a starting time (e.g., starting time ($T_0$) 288) in the time domain to offset the time shift. Additionally, the user equipment determines a central frequency (central frequency ($F_0$) 284) based on, for example, communication channel information (e.g., regulatory restrictions, designated channel bandwidths and boundaries). In embodiments where the user equipment 10 estimates only the frequency shift and not the time shift, the user equipment 10 may not adjust the uplink signal I/Q samples based on the time compensation.

After the adjustments in the time domain, at block 322, the user equipment 10 determines whether the frequency compensation (determined at block 318) is less than the threshold of transmission frequency compensation allowed within the channel bandwidth 234 of the selected channel 2.

In response to determining that the frequency compensation is less than the threshold of transmission frequency compensation, at block 324, the user equipment 10 adjusts the uplink signal I/Q samples based on the frequency compensation. Such frequency adjustments may pre-compensate the uplink signal I/Q samples such that the actually transmitted uplink signal I/Q samples may be adjusted to the central frequency ($F_0$) 284 in the frequency domain to offset the frequency shift. In embodiments where the user equipment 10 estimates only the time shift and not the frequency shift, the user equipment 10 may not adjust the uplink signal I/Q samples based on the frequency compensation. At block 326, the user equipment 10 transmit the uplink signals to the communication node 102. The transmitted uplink signals have pre-compensations in time and frequency domains, such that the actual bandwidth of the transmitted uplink signals is consistently within the designated channel bandwidth (e.g., channel bandwidth 234) of the selected channel (e.g., channel 2).

In response to determining that the frequency compensation is larger than the threshold of transmission frequency compensation, at block 328, the user equipment 10 pauses signal transmissions in a current cycle. To improve performance of the wireless communications while still meeting the regulatory constraints, at block 330, the user equipment 10 starts a counter to count how many consecutive signal transmission cycles are being paused. When the count becomes larger than a threshold number, at block 332, the user equipment 10 sends a request to select a new communication node (e.g., from the list of communication nodes, or a different list of communication nodes from upper layers), as it is likely that the selected communication node 102 may not be used for wireless communication due to the frequency shift being too excessive to compensate for. In this manner, the method 300 may enable the user equipment 10 to dynamically adjust transmission signals to meet regulatory restrictions for wireless communication.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment, comprising:

a transceiver;

a temperature sensor; and processing circuitry coupled to the transceiver, the processing circuitry configured to receive an indication of a time shift associated with a channel based on a crystal drift, the crystal drift associated with a temperature based on the temperature sensor and a synchronization signal, the synchronization signal based on a first set of data samples of a first signal transmitted using the channel, wherein the channel is associated with a beam emitted by a communication node, adjust a second set of data samples of a second signal based on a frequency shift associated with the channel and the time shift, and transmit, from the transceiver, the second signal to the communication node using the channel associated with the beam.

2. The user equipment of claim 1, wherein the processing circuitry is configured to determine the communication node by performing a communication node search using a plurality of communication node identifiers associated with a plurality of communication nodes.

3. The user equipment of claim 2, comprising a memory storing a database, the processing circuitry being configured to perform the communication node search by extracting node data from communication node information stored in the database based on the plurality of communication node identifiers.

4. The user equipment of claim 3, wherein the node data comprises timing, orbit, and elevation data associated with the plurality of communication nodes, a global position of the user equipment, orientation data and motion data of the user equipment, relative positioning data between the user equipment and each of the plurality of communication nodes, or any combination thereof.

5. The user equipment of claim 1, wherein the processing circuitry is configured to synchronize to the communication node based on a synchronization request from a Layer 1 controller, the synchronization request comprising a communication identifier corresponding to the communication node.

6. The user equipment of claim 1, wherein the processing circuitry is configured to determine the beam by performing a beam search using a plurality of beam identifiers associated with a plurality of beams emitted by the communication node.

7. The user equipment of claim 6, comprising a memory storing a database, the processing circuitry being configured to perform the beam search by extracting beam data from communication node information stored in the database based on the plurality of beam identifiers.

8. The user equipment of claim 7, wherein the beam data comprises a plurality of radio parameters associated with the plurality of beams, the plurality of radio parameters comprising root sequence, spreading code, scrambling code, or any combination thereof, associated with a plurality of fields, wherein the plurality of fields comprise preamble, broadcast interval, broadcast (BCAST), unicast (UCAST) data, or any combination thereof, associated with each of the plurality of beams.

9. The user equipment of claim 1, wherein the processing circuitry is configured to determine the channel by performing a channel search using a plurality of channel identifiers associated with a plurality of channels associated with the beam.

10. The user equipment of claim 9, comprising a memory storing a database, the processing circuitry being configured to perform the channel search by extracting channel data from communication node information stored in the database based on the plurality of channel identifiers.

11. The user equipment of claim 10, wherein the channel data comprises regulatory restrictions, designated channel bandwidths, boundaries associated with the plurality of channels, or any combination thereof.

12. The user equipment of claim 1, wherein the processing circuitry is configured to determine a transmission frequency compensation threshold based at least in part on a bandwidth of the channel, a center frequency of the channel, one or more guard bands associated with the channel, one or more frequency regulations, or any combination thereof; and adjust the second set of data samples based on the frequency shift being less than or equal to the transmission frequency compensation threshold.

13. The user equipment of claim 1, wherein the processing circuitry is configured to estimate the frequency shift based on movement, location, orientation data, or any combination thereof, associated with the communication node, a global navigation satellite system time, location data, or any combination thereof, associated with the user equipment.

14. A non-transitory, computer-readable medium comprising instructions that, when executed by processing circuitry of user equipment, cause the processing circuitry to:

receive an indication of a time shift associated with a channel based on a temperature reading of the user equipment and a synchronization signal, the synchronization signal being based on a first set of data samples of a first signal transmitted to the user equipment using the channel, the channel being associated with a beam emitted by a communication node;

adjust a second set of data samples of a second signal based on the time shift associated with the channel; and transmit, at a transmitter, the second signal to the communication node using the channel associated with the beam.

15. The non-transitory, computer-readable medium of claim 14, wherein the instructions cause the processing circuitry to:

receive the temperature reading from a temperature sensor; and detect the synchronization signal based on the first set of data samples.

16. An electronic device, comprising:

a transceiver; and processing circuitry communicatively coupled to the transceiver and configured to receive an indication of a time shift associated with a channel based on a temperature of the electronic device and a synchronization signal, the synchronization signal being based on a first set of data samples of a first signal transmitted to the transceiver using the channel, the channel being associated with a beam emitted by a communication node, adjust a second set of data samples of a second signal based on a frequency shift associated with the channel and the time shift associated with the channel, and transmit, using the transceiver, the second signal to the communication node using the channel associated with the beam.

17. The electronic device of claim 16, wherein the processing circuitry is configured to determine a transmission frequency compensation threshold based at least in part on a bandwidth of the channel, a center frequency of the channel, one or more guard bands associated with the channel, one or more frequency regulations, or any combination thereof, determine the frequency shift associated with the channel based on movement, location, orientation data, or any combination thereof, associated with the communication node, a global navigation satellite system time, location data, or any combination thereof, associated with the electronic device, and adjust the second set of data samples based on the frequency shift associated with the channel being less than or equal to the transmission frequency compensation threshold.

18. The electronic device of claim 16, wherein the processing circuitry is configured to receive the indication of the synchronization signal based on a preamble of a downlink in-phase/quadrature (I/Q) sample of the first set of data samples.

19. The user equipment of claim 12, wherein the processing circuitry is configured to, based on the frequency shift being greater than the transmission frequency compensation threshold, pause signal transmissions for a communication cycle, initiate a counter to count consecutive signal transmission cycles being paused, and transmit, from the transceiver, a request for selecting a new communication node based on the count being larger than a threshold number.

20. The electronic device of claim 17, wherein the processing circuitry is configured to, based on the frequency shift being greater than the transmission frequency compensation threshold, pause signal transmissions for a communication cycle, initiate a counter to count consecutive signal transmission cycles being paused, and transmit, from the transceiver, a request for selecting a new communication node based on the count being larger than a threshold number.

* * * * *